US008727430B2

(12) United States Patent
Schröferl

(10) Patent No.: US 8,727,430 B2
(45) Date of Patent: May 20, 2014

(54) ROOF ARRANGEMENT AND METHOD FOR PRODUCING A ROOF ARRANGEMENT

(75) Inventor: Thomas Schröferl, Hohenschäftlarn (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/579,279

(22) PCT Filed: Mar. 7, 2012

(86) PCT No.: PCT/EP2012/053916
§ 371 (c)(1),
(2), (4) Date: Oct. 26, 2012

(87) PCT Pub. No.: WO2012/123309
PCT Pub. Date: Sep. 20, 2012

(65) Prior Publication Data
US 2013/0038091 A1 Feb. 14, 2013

(30) Foreign Application Priority Data
Mar. 14, 2011 (DE) .......................... 10 2011 013 819

(51) Int. Cl.
*B62D 25/06* (2006.01)
(52) U.S. Cl.
USPC ........................................ 296/213; 296/210
(58) Field of Classification Search
USPC .......... 296/213, 38, 216.04, 154, 216.09, 210
IPC ....................................................... B62D 25/06
See application file for complete search history.

(56) References Cited

U.S. PATENT DOCUMENTS

| 6,877,796 | B2* | 4/2005 | Kimura .................... 296/187.13 |
| 8,167,364 | B2* | 5/2012 | Burns ........................... 296/210 |
| 2006/0152043 | A1 | 7/2006 | Bonneau |
| 2008/0136219 | A1* | 6/2008 | Berryhill et al. .............. 296/213 |
| 2008/0272625 | A1 | 11/2008 | Paetz et al. |
| 2009/0066110 | A1 | 3/2009 | Beierl et al. |

FOREIGN PATENT DOCUMENTS

| DE | 19906516 A1 | 8/2000 |
| DE | 19939978 A1 | 1/2001 |
| DE | 102004007988 A1 | 9/2005 |
| DE | 102007042831 A1 | 3/2009 |
| EP | 1310394 A1 | 5/2002 |

(Continued)

OTHER PUBLICATIONS

International Preliminary Report on Patentability dated May 18, 2012, for PCT/EP2012/053916.

*Primary Examiner* — Glenn Dayoan
*Assistant Examiner* — Pinel Romain
(74) *Attorney, Agent, or Firm* — Fitch, Even, Tabin & Flannery LLP

(57) ABSTRACT

The invention relates to a roof arrangement having a cover for closing the opening in a vehicle roof, a fixing plate, which is connected to the cover for fixing the cover to the vehicle roof, wherein the fixing plate is partially insert molded with a plastic material, so that the plastic material forms a water channel on the upper side of the plate. According to the invention it is characterized in that an injection-molded masking piece is formed on the underside of the fixing plate and the fixing plate in the area of the masking piece has at least one aperture, through which the plastic material of the water channel and of the masking piece can be connected to one another. The invention also relates to a suitable method for producing such a roof arrangement.

7 Claims, 1 Drawing Sheet

(56) References Cited

FOREIGN PATENT DOCUMENTS

Figure 1:
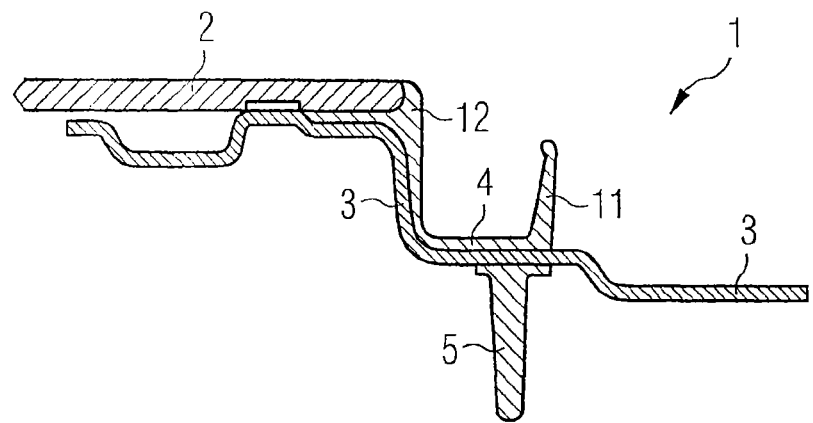

| JP | S59-031569 U | 2/1984 |
| JP | 64 030782 | 1/1989 |
| JP | H02-61725 U | 5/1990 |
| JP | 03000212 U | 8/1994 |
| JP | 3053379 U | 10/1998 |
| JP | 11170927 A | 6/1999 |
| JP | 2000-318456 A | 11/2000 |
| JP | 2002509823 A | 4/2002 |
| JP | 2008-168778 A | 7/2008 |

* cited by examiner

ROOF ARRANGEMENT AND METHOD FOR PRODUCING A ROOF ARRANGEMENT

CROSS-REFERENCE TO RELATED APPLICATIONS

This application is a U.S. National Stage filing under 35 U.S.C. 371 of International Application No. PCT/EP2012/053916, filed Mar. 7, 2012, designating the United States and claims the benefit of foreign priority from German Patent Application Number 10 2011 013 819.6, filed Mar. 14, 2011, the entire disclosures of which are incorporated herein by reference.

The invention relates to a roof arrangement having a cover for closing the opening in a vehicle roof and a fixing plate, which is connected to the cover for fixing the cover to the vehicle roof, wherein the fixing plate is partially insert molded with a plastic material, so that the plastic material forms a water channel on the upper side of the plate.

Such roof arrangements are often fixed roof elements made of glass. A seal is generally arranged in the edge area of the cover, between this and the vehicle roof, but this seal is not suited to sealing the glazed cover fully in relation to the vehicle roof. In order nevertheless to allow a controlled drainage of water getting in, a water channel, which collects the water getting in and drains this away from an end area of the water channel through an outlet, is provided under the gap between the cover and the vehicle roof.

Methods are known for molding a masking piece on the underside of the cover, in order that the areas in which the fixing plate is connected to the vehicle roof are not visible from the vehicle interior. Such a roof arrangement is relatively complicated to produce, since the arrangement comprising a cover and a fixing plate has to be insert molded from both sides. Insert molding of such a volume moreover involves a large material outlay.

In the past masking pieces have therefore been adhesively bonded on the underside of the fixing plate. This meant that it was sufficient for the arrangement comprising a cover and a fixing plate to be insert foam molded merely on the upper side, such a partial insert foam molding serving to connect the cover to the fixing plate and at the same time to form the water channel.

The object of the invention is to specify a roof arrangement, which comprises a water channel on the upper side and a masking piece on the underside, but which is more cost-effective to produce. A further object of the invention is to specify a more cost-effective method for producing a roof arrangement.

This object is achieved by a roof arrangement of the aforementioned type, which is characterized in that an injection-molded masking piece is formed on the underside of the fixing plate and the fixing plate in the area of the masking piece has at least one aperture, through which the plastic material of the water channel and of the masking piece can be connected to one another.

The object is achieved in respect of the method by a method for producing a roof arrangement having a cover and a fixing plate, wherein the method comprises the steps:
  inserting the fixing plate and the cover into a holder,
  applying an injection mold to the upper side of the arrangement comprising a cover and a fixing plate,
  applying an injection mold to the underside of the arrangement comprising a cover and a fixing plate,
  feeding soft plastic material to a cavity on the upper side or the underside of the fixing plate, so that the plastic material on the upper side of the fixing plate connects this to the cover and forms a water channel, and on the underside of the fixing plate forms a masking piece, the plastic material being able to pass from one side of the fixing plate to the other through an aperture of the fixing plate in the area of the masking piece.

The roof arrangement according to the invention therefore comprises a masking piece, which can be produced by insert foam molding or insert molding. This means that no separate parts or assembly operations are necessary. It is nevertheless possible to dispense with a full insert foam molding, which is material-intensive and complicated. When insert foam molding the upper side of the fixing plate, the plastic material is able to pass through the apertures, provided according to the invention in the fixing plate, to the underside, where it forms the masking piece. A single foaming operation, which may be performed either from the upper side or from the underside, is therefore sufficient.

The terms "insert molding" and "insert foam molding" are used synonymously in the context of the description of the invention, since they are used only to differentiate according to the material used. The invention can be used with different plastics, however, so that both terms may be used.

It is particularly advantageous if the fixing plate has two apertures in the areas of the masking piece. The plastic material flow can thereby be distributed to the upper side and the underside when feeding the plastic material into the injection molds at the first aperture, and the material flows can be recombined in the other end area of the masking piece.

Further advantageous developments of the invention are specified in the dependent claims.

Figure 2:
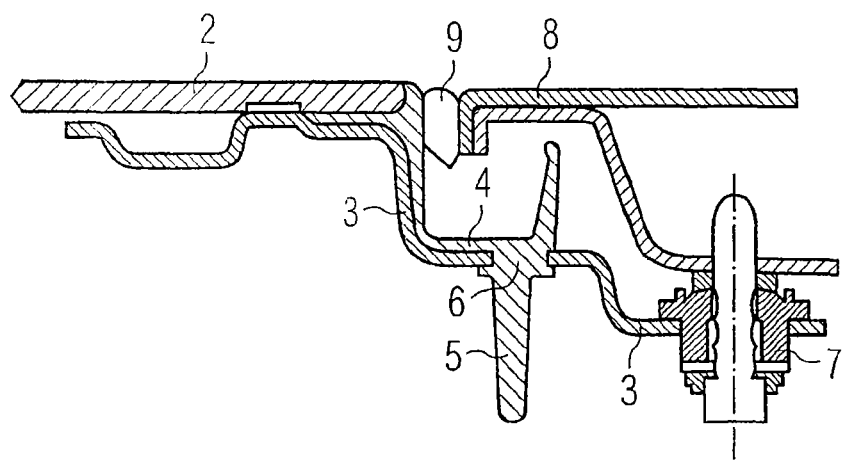
Figure 3:
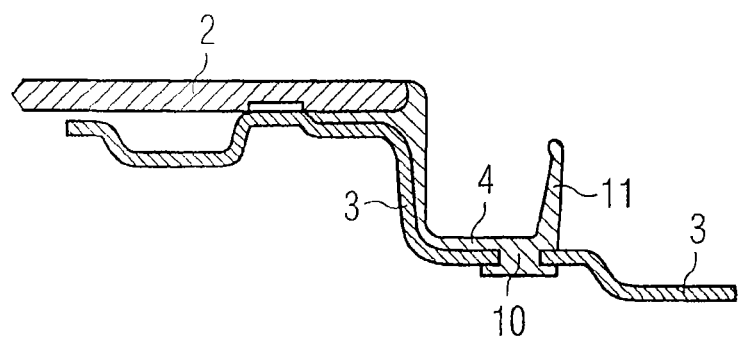

The invention is explained in more detail below with reference to an exemplary embodiment. In the drawing:

FIG. 1 shows a cross section through the edge area of a cover, and a fixing plate connected to the cover, FIG. 2 shows a cross section through the edge area of the arrangement comprising a cover and a fixing plate in the molded attachment area and FIG. 3 shows a cross section through the edge area of the arrangement comprising a cover and a fixing plate in the other end area of the masking piece.

In the exemplary embodiment of the invention represented in FIG. 1 a roof arrangement is shown, in which a glazed cover 2 is connected to a fixing plate 3 by an insert molding 12. The insert molding 12 fills a gap between the fixing plate 3 and the glazed cover 2 and at the same time encloses the edge of the glazed cover. The insert molding is carried over on the surface of the fixing plate 3, where it forms a U-shaped channel, which in the fitted state in a vehicle serves as water channel 4. A masking piece 5 is molded on the underside of the fixing plate in the area of the water channel 4. Like the water channel 4, this masking piece is produced on the upper side in the injection molding method. Apart from the masking piece 5, no insert molding is provided on the underside of the fixing plate 3. All in all the arrangement can be achieved with a minimum use of plastic material.

The plastic material for the insert foam molding is polyurethane-based, but where necessary other plastics may also be used.

As can be seen from FIG. 2, according to the invention an aperture 6, through which the plastic material of the water channel 4 and the masking piece 5 are connected together, is provided in the fixing plate 3. The section represented is situated in an end area of the masking piece 5. This is the area in which the molded attachment is made when producing the roof arrangement. If the molded attachment site is situated on the upper side of the fixing plate 3, the plastic material fed in is able to pass through the aperture 6 to the underside, where it forms the masking piece 5.

In the production process, injection molds, which have cavities, which precisely represent the water channel and the masking piece as a negative mold, are applied to the upper side and the underside. The plastic material fed in, which passes into the cavity on the underside of the fixing plate, therefore fills up this cavity and in so doing displaces the air present in the cavity. Venting passages must therefore either be provided in the injection mold, or, as preferred by the invention, there must be a further aperture 10 in the fixing plate in the other end area of the masking piece 5, as is represented in FIG. 3. At this point the air can escape back upwards from the cavity of the lower injection mold.

The plastic material fed in at the end area represented in FIG. 2 is divided into two material flows, one material flow on the upper side forming the insert molding 12 in the edge area of the cover 2 and the water channel, and the other material flow on the underside forming the masking piece 5. In the area of the aperture 10 the material flows run together again, so that the cavities on the upper side and the underside of the fixing plate 3 can be completely filled.

FIG. 2 moreover shows how the arrangement comprising a cover 2 and a fixing plate 3 is fixed in a vehicle. On the side of the masking piece 5 remote from the cover 2 is a fixing device 7, which serves for height-adjustable connection of the fixing plate to a vehicle roof 8. The device is preferably a screwed connection, the screw simultaneously serving as height adjustment screw. The vehicle roof 8 is angled in the area of a gap between the vehicle roof 8 and the cover 2. In this area an additional seal 9 is provided, which in particular prevents dirt getting into the water channel 4. It also prevents water penetrating through the gap into the vehicle interior. Since a 100% leak-tightness cannot be guaranteed, however, the water channel 4, as described at the outset, ensures that any water getting in is caught and reliably drained.

The exemplary embodiment described is to be taken as an example. The scope of the patent encompasses modifications. In particular, it is possible to extend the side 11 of the water channel 4 upwards, so that it may come into contact with the vehicle roof 8, as can easily be seen by looking at FIG. 2. This may also afford an additional sealing of the connecting area between the glazed cover 2 and the vehicle roof 8. This is particularly advantageous in the draining area of the water channel 4, where penetrating water can back up.

The invention claimed is:

1. A roof arrangement having a cover for closing the opening in a vehicle roof and a fixing plate, which is connected to the cover for fixing the cover to the vehicle roof, wherein the fixing plate is partially insert molded with a plastic material, so that the plastic material forms a water channel on an upper side of the plate, wherein an injection-molded masking piece is formed on an underside of the fixing plate and the fixing plate in an area of the masking piece has at least one aperture, through which the plastic material of the water channel and of the masking piece can be connected to one another.

2. The roof arrangement according to claim 1, wherein the fixing plate comprises a device for height adjustment on the side remote from the cover.

3. The roof arrangement according to claim 1, wherein an aperture is provided in each of two end areas of the masking piece.

4. The roof arrangement according to claim 1 wherein apart from the masking piece the fixing plate is free of plastic insert moldings on the underside.

5. A method for producing a roof arrangement having a cover and a fixing plate, wherein the steps comprise:
   inserting the fixing plate and the cover into a holder,
   applying an injection mold to the upper side of the arrangement comprising a cover and a fixing plate,
   applying an injection mold to an underside of the arrangement comprising a cover and a fixing plate,
   feeding a plastic material to a cavity on the upper side or the underside of the fixing plate, so that the plastic material on the upper side of the fixing plate connects this to the cover and forms a water channel, and on the underside of the fixing plate forms a masking piece, the plastic material being able to pass from one side of the fixing plate to the other through an aperture of the fixing plate in the area of the masking piece.

6. The method according to claim 5, wherein the molded attachment site is situated on the upper side of the fixing plate.

7. The method according to claim 5, wherein two apertures are provided each in an end area of the masking piece, the plastic material flow, when feeding in the plastic material, being divided at the first aperture into two plastic material flows, and the two plastic material flows being recombined at the second aperture.

* * * * *